United States Patent
Yu

(10) Patent No.: US 11,464,609 B2
(45) Date of Patent: Oct. 11, 2022

(54) ARTIFICIAL TOOTH MOLDING APPARATUS AND METHOD

(71) Applicant: AON CO., LTD., Gyeonggi-do (KR)

(72) Inventor: Hag Dong Yu, Gyeonggi-do (KR)

(73) Assignee: AON CO., LTD., Gyeonggi-do (KR)

( * ) Notice: Subject to any disclaimer, the term of this patent is extended or adjusted under 35 U.S.C. 154(b) by 0 days.

(21) Appl. No.: 16/959,934

(22) PCT Filed: Apr. 7, 2018

(86) PCT No.: PCT/KR2018/004107
§ 371 (c)(1),
(2) Date: Jul. 2, 2020

(87) PCT Pub. No.: WO2019/142973
PCT Pub. Date: Jul. 25, 2019

(65) Prior Publication Data
US 2020/0390530 A1    Dec. 17, 2020

(30) Foreign Application Priority Data

Jan. 17, 2018  (KR) .......... 10-2018-0006003

(51) Int. Cl.
*A61C 13/08* (2006.01)
*B33Y 10/00* (2015.01)
(Continued)

(52) U.S. Cl.
CPC ........ *A61C 13/081* (2013.01); *A61C 13/0004* (2013.01); *A61C 13/083* (2013.01); *B28B 1/001* (2013.01); *B28B 17/0081* (2013.01); *B29C 64/165* (2017.08); *B29C 64/264* (2017.08); *B29C 64/393* (2017.08); *B33Y 10/00* (2014.12); *B33Y 30/00* (2014.12); *B33Y 50/02* (2014.12); *B33Y 70/10* (2020.01); *B33Y 80/00* (2014.12);
(Continued)

(58) Field of Classification Search
CPC ...... A61C 13/081; B33Y 10/00; B33Y 30/00; B33Y 50/00; B33Y 80/00; B33Y 70/10; B29C 64/264; B29C 64/393; B29C 64/165
See application file for complete search history.

(56) References Cited

U.S. PATENT DOCUMENTS

2012/0261848 A1  10/2012  Harasza
2015/0309473 A1*  10/2015  Spadaccini ........... B29C 64/135
                                                                    359/3

FOREIGN PATENT DOCUMENTS

JP      2017036506       2/2017
KR      20090023946      3/2009
(Continued)

*Primary Examiner* — Larry W Thrower
(74) *Attorney, Agent, or Firm* — IPLA P.A.

(57) ABSTRACT

An artificial tooth molding apparatus comprises: a calculation control unit (10) configured to calculate and convert 3D graphic data (D_g) required for a process of molding an artificial tooth into continuous tomographic data (D_1) and to output the tomographic data (D_1); an elevation means (20) configured to form the artificial tooth (T); a tank (30) containing the ceramic mixture solution (S) provided for immersion of the formation stage (22) of the elevation means (20); an irradiation means (40) configured to irradiate the formation stage (22) with ultraviolet rays; and a filter part (50) configured to filter an ultraviolet irradiation area irradiated with the ultraviolet rays.

9 Claims, 3 Drawing Sheets

(51) Int. Cl.
*B33Y 30/00* (2015.01)
*B33Y 50/02* (2015.01)
*B33Y 80/00* (2015.01)
*B29C 64/264* (2017.01)
*B29C 64/393* (2017.01)
*B29C 64/165* (2017.01)
*B33Y 70/10* (2020.01)
*A61C 13/00* (2006.01)
*A61C 13/083* (2006.01)
*B28B 1/00* (2006.01)
*B28B 17/00* (2006.01)
*B29K 33/04* (2006.01)
*B29L 31/00* (2006.01)

(52) U.S. Cl.
CPC ... *B29K 2033/04* (2013.01); *B29L 2031/7536* (2013.01)

(56) References Cited

FOREIGN PATENT DOCUMENTS

| | | |
|---|---|---|
| KR | 20110064653 | 6/2011 |
| KR | 101740541 | 5/2017 |
| KR | 101761316 | 7/2017 |

\* cited by examiner

ARTIFICIAL TOOTH MOLDING APPARATUS AND METHOD

BACKGROUND

The present disclosure relates to an artificial tooth molding apparatus and a method thereof. More particularly, the present disclosure relates to an apparatus and a method for molding a procedural tooth for human use by continuously molding ceramic powder included in liquid base layer by layer in a process of molding an artificial tooth.

In general, dental laboratory technique refers to the work of manufacturing, repairing, and processing dental prosthesis, such as providing a denture on teeth, partially crowning and providing orthodontic appliances on teeth, and dental technician constructs dental prosthesis based on a request according to a prescription.

Conventionally, an operation of making artificial teeth that has been performed manually or by using a molding apparatus has relied on the molding technique of skilled workers. Therefore, it was difficult to easily perform the precise operation of making artificial teeth with the same shape.

In order to solve the above problem, according to Korean Patent Application Publication No. 10-2009-0023946, as shown in FIG. 1, the invention discloses an apparatus for forming teeth, the apparatus including a work table; a frame holder installed on the work table and to which a model teeth frame and a molding teeth frame are mounted; first and second support shafts installed at a second side of the frame holder; a four link assembly coupled to the first and second support shafts; a processing lever installed correspondingly to the molding teeth frame and a guide lever installed correspondingly to the model teeth frame from the four link assembly; a dust collecting cover provided at a lower portion of the frame holder for collecting machining dust; and a vacuum machine connected to the dust collecting cover to suction the machining dust. The conventional apparatus for forming teeth is configured to mold an artificial tooth by carving and then process the artificial tooth by plastic forming.

However, since the conventional artificial tooth is formed by molding the artificial tooth through carving, a rotating table for an artificial tooth to be processed is required for carving processing. In the case of the carving processing for a 3D shape, when a blind spot exists in the processing, it is difficult to perform the processing. Moreover, the conventional artificial tooth processing takes a lot of processing time, thus lowering productivity.

Accordingly, there is a need to develop a technique that can solve the above problems.

SUMMARY OF THE INVENTION

Accordingly, the present disclosure has been made keeping in mind the above problems occurring in the related art, and an objective of the present disclosure is to provide an artificial tooth molding apparatus and a method, which are capable of improving the productivity of a process of molding an artificial tooth.

According to the present disclosure, the immersion of ceramic mixture solution S and ultraviolet curing are repeatedly performed according to the area of a cross-section of an artificial tooth T by operating the elevation means 20 and the filter part 50 in response to the order of a calculation control unit 10.

As described above, the immersion of the ceramic mixture solution S and ultraviolet curing are repeatedly performed according to the area of a cross-section of the artificial tooth T by operating the elevation means 20 and the filter part 50 by the calculation control unit 10, so that the artificial tooth T can be manufactured by removing a shaded area accompanying the process of molding the artificial tooth. Accordingly, ex-post carving process can be largely omitted, so that the efficiency of manufacturing process thereof can be improved and manufacturing costs thereof can be reduced.

DETAILED DESCRIPTION OF THE INVENTION

Figure 1:
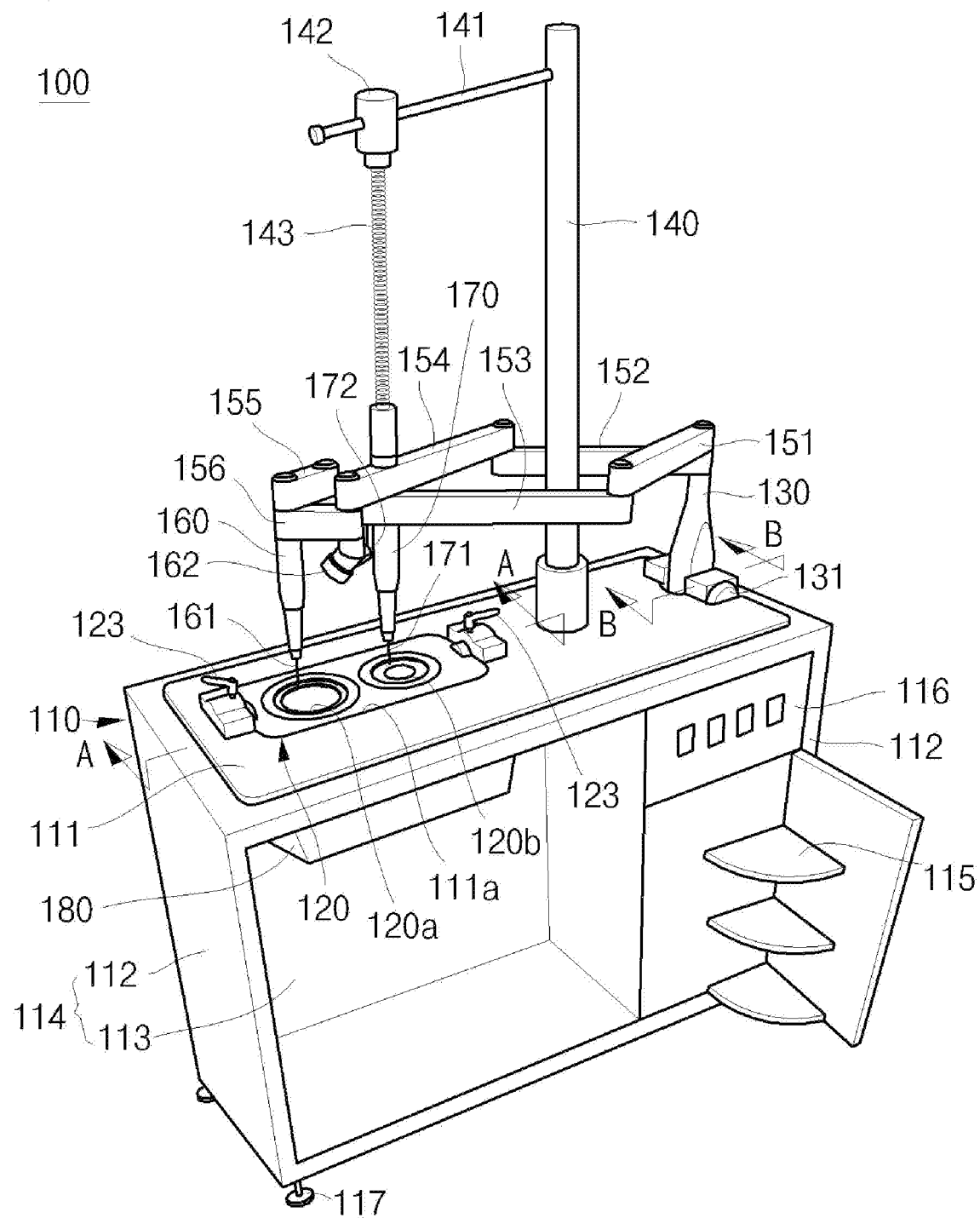
FIG. 1 is a perspective view schematically showing a tooth molding apparatus according to Korean Patent Application Publication No. 10-2009-0023946.
Figure 2:
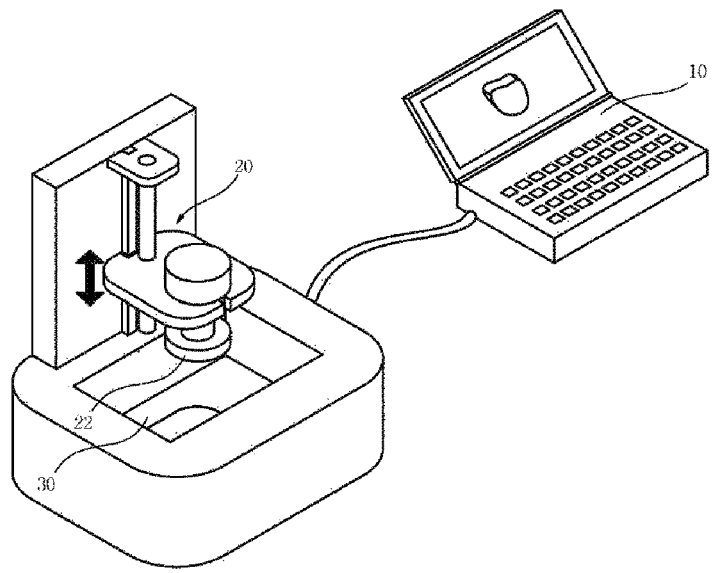
FIG. 2 is a perspective view schematically showing an artificial tooth molding apparatus according to an exemplary embodiment of the present disclosure.
Figure 3:
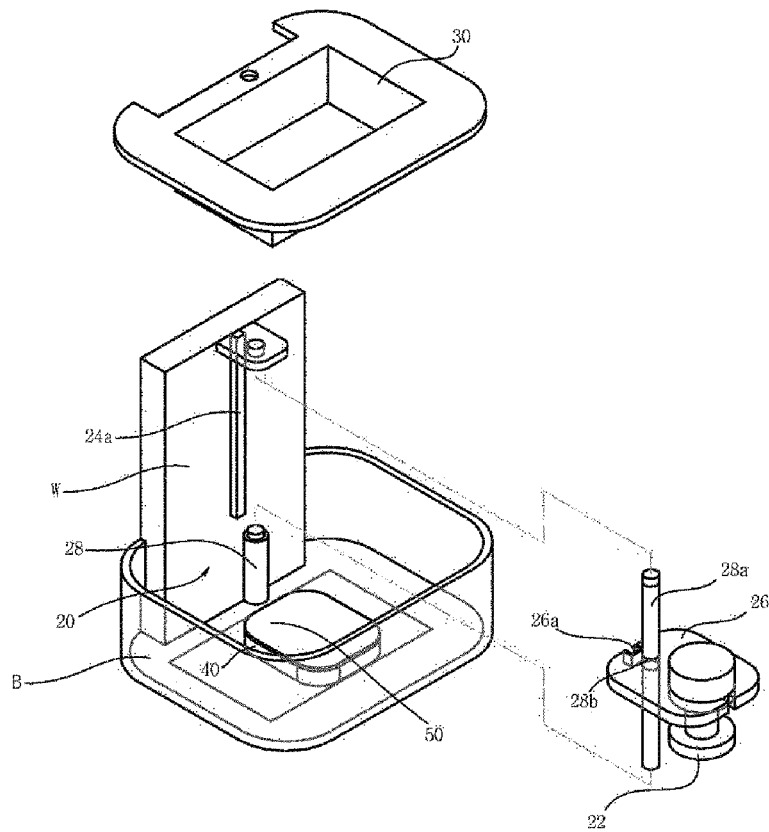
FIG. 3 is an exploded perspective view schematically showing the artificial tooth molding apparatus according to the exemplary embodiment of the present disclosure.
Figure 4A:
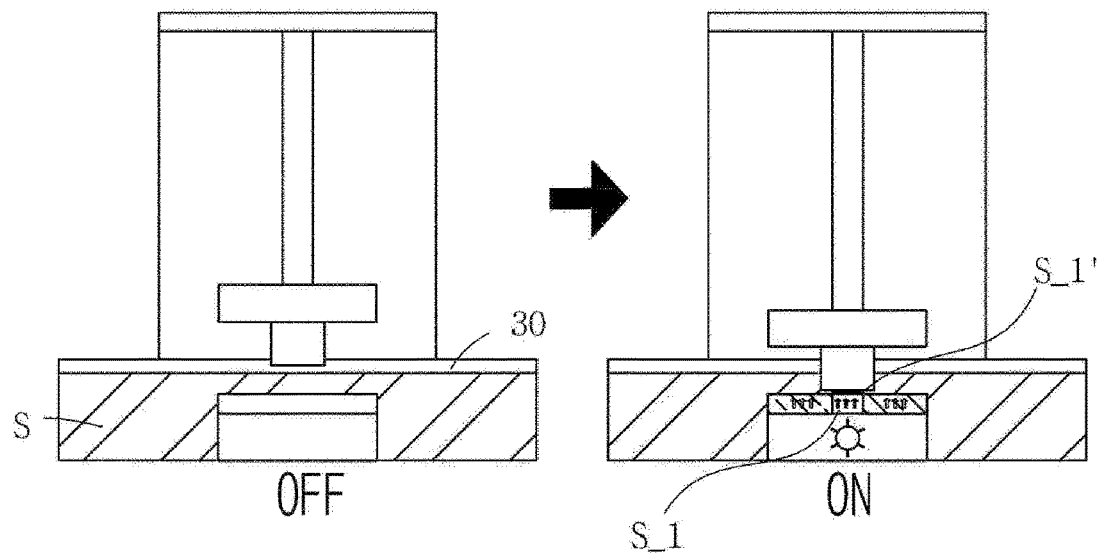
FIGS. 4A to 4C are main part views schematically showing operation of the artificial tooth molding apparatus according to the exemplary embodiment of the present disclosure.
Figure 4B:
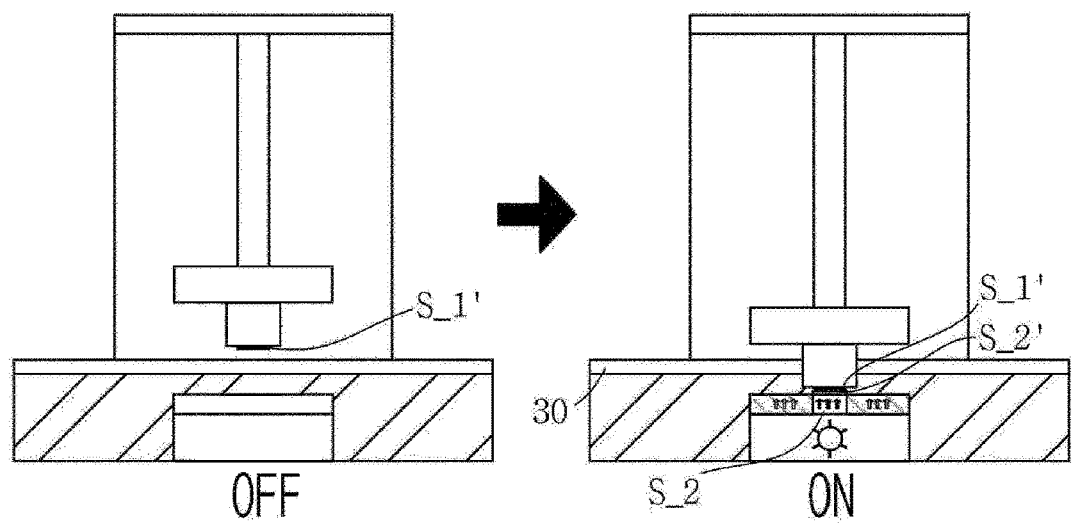
Figure 4C:
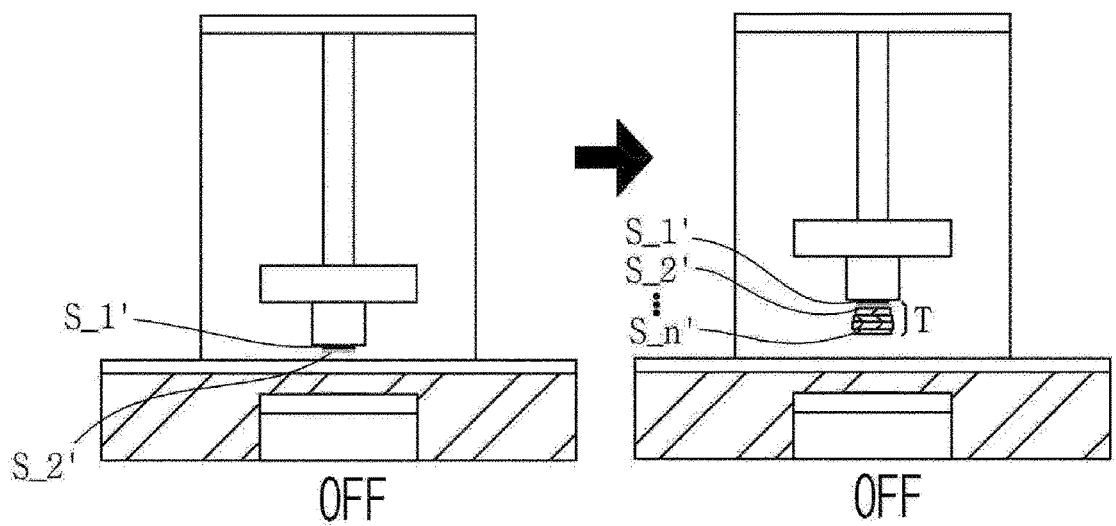

According to the present disclosure, an artificial tooth molding apparatus is provided, the artificial tooth molding apparatus including a calculation control unit 10 configured to calculate and convert 3D graphic data ($D\_g$) required for a process of molding an artificial tooth into continuous tomographic data ($D\_1$) and to output the tomographic data ($D\_1$), an elevation means 20 configured to form the artificial tooth T by immersing a formation stage 22 of the artificial tooth T into gel-type ceramic mixture solution S in which ceramic powder and ultraviolet curing agent are mixed for a predetermined time in response to the tomographic data ($D\_1$) output from the calculation control unit 10, a tank 30 containing the ceramic mixture solution S for immersion of the formation stage 22 of the elevation means 20, an irradiation means 40 configured to irradiate the formation stage 22, which is in contact with the ceramic mixture solution S in the tank 30, with ultraviolet rays, and a filter part 50 configured to filter an ultraviolet irradiation area ($S\_1, S\_2, \ldots,$ and $S\_n$) irradiated with the ultraviolet rays, which are radiated from the irradiation means 40 to the formation stage 22, in response to the tomographic data ($D\_1$) output from the calculation control unit 10.

Hereinbelow, an artificial tooth molding apparatus according to an exemplary embodiment of the present disclosure will be described in detail with reference to the accompanying drawings.

The elevation means 20 includes a guide block 26 guided and a screw 28a allowing the guide block 26 to perform translational motion by operation of a motor 28. The guide block 26 includes a guide groove 26a guided by being fitted over a guide rail 24a and a screw thread 28b provided to convert rotational motion of the screw 28a into rectilinear motion. The motor 28 performs normal rotation and reverse rotation by control of the calculation control unit 10 thus raising and lowering the guide block 26 along the guide rail 24a.

The irradiation means 40 is configured to irradiate the formation stage 22, which is in contact with the ceramic mixture solution S in the tank 30, with ultraviolet rays.

The filter part 50 includes a polarizing element, which is provided to filter the ultraviolet irradiation area (S_1, S_2, . . . , and S_n), which is irradiated with the ultraviolet rays radiated from the irradiation means 40 to the formation stage 22, in response to the tomographic data (D_1) output from the calculation control unit 10.

As described above, in the artificial tooth molding apparatus according to the exemplary embodiment of the present disclosure, the immersion of the ceramic mixture solution S and ultraviolet curing are repeatedly performed according to area of a cross-section of the artificial tooth T by operations of the elevation means 20 and the filter part 50 by the calculation control unit 10. Thus the artificial tooth T may be manufactured by removing a shaded area accompanying the process of molding the artificial tooth. Accordingly, posterior carving process may be largely omitted, so that the efficiency of manufacturing process thereof can be improved and manufacturing costs thereof can be reduced.

Hereinbelow, according to the present disclosure, since ex-post carving process of the artificial tooth can be largely omitted, the efficiency of the manufacturing process can be improved and the manufacturing costs can be reduced.

The invention claimed is:

1. An artificial tooth molding apparatus comprising:
a calculation control unit (10) configured to calculate and convert 3D graphic data (D_g) required for a process of molding an artificial tooth into continuous tomographic data (D_1) and to output the tomographic data (D_1);
an elevation means (20) configured to form the artificial tooth (T) by immersing a formation stage (22) of the artificial tooth into gel-type ceramic mixture solution (S) in which ceramic powder and ultraviolet curing agent are mixed for a predetermined time in response to the tomographic data (D_1) input from the calculation control unit (10);
a tank (30) containing the ceramic mixture solution (S) provided for immersion of the formation stage (22) of the elevation means (20);
an irradiation means (40) configured to irradiate the formation stage (22) with ultraviolet rays, the formation stage (22) being in contact with the ceramic mixture solution (S) in the tank (30); and
a filter part (50) configured to filter an ultraviolet irradiation area (S_1, S_2, . . . , and S_n) irradiated with the ultraviolet rays, which are radiated from the irradiation means (40) to the formation stage (22), in response to the tomographic data (D_1) output from the calculation control unit (10).

2. The artificial tooth molding apparatus of claim 1, wherein the calculation control unit (10) calculates and converts the 3D graphic data (D_g) required for the process of molding the artificial tooth into the tomographic data (D_1) having continuous sections and outputs the tomographic data (D_1), and controls the filter part (50) so that a section of the artificial tooth for the process of molding the artificial tooth is irradiated with the ultraviolet rays in response to the tomographic data (D_1).

3. The artificial tooth molding apparatus of claim 2, wherein the filter part (50) is configured to shield electromagnetic radiation in response to polarization of pixel unit.

4. The artificial tooth molding apparatus of claim 2, wherein when the formation stage (22) of the artificial tooth (T) is immersed in the ceramic mixture solution (S) by the elevation means (20), the calculation control unit (10) controls the ultraviolet irradiation area (S_1, S_2, . . . , and S_n) that is a light transmission area of the filter part (50), so that the ultraviolet rays are transmitted from an alveolar bone portion of the artificial tooth to an area corresponding to a sectional area (S_1', S_2', . . . , and S_n').

5. The artificial tooth molding apparatus of claim 4, wherein the elevation means (20) comprises a guide rail (24*a*), a guide block (26), and a screw (28*a*), the guide rail (24*a*) being provided to raise and lower the formation stage (22) with respect to a side wall (W) extending from one side of a base (B) of a main body, the guide block (26) being guided along the guide rail (24*a*), and the screw (28*a*) allowing the guide block (26) to perform translational motion by operation of a motor (28).

6. The artificial tooth molding apparatus of claim 5, wherein the guide block (26) comprises a guide groove (26*a*) and a screw thread (28*b*), the guide groove (26*a*) being guided by being fitted over the guide rail (24*a*) and the screw thread (28*b*) being provided to convert rotational motion of the screw (28*a*) into straight-linear motion.

7. The artificial tooth molding apparatus of claim 1, wherein the ceramic mixture solution (S) comprises 5% to 15% by weight of an acrylate-based oligomer compound, 1% to 10% by weight of an acrylate-based monomer, 1% to 10% by weight of a photoinitiator, and 1% to 10% by weight of a dispersant, on the basis of 100% by weight of the ceramic powder.

8. The artificial tooth molding apparatus of claim 7, wherein the ceramic powder comprises zirconia powder.

9. The artificial tooth molding apparatus of claim 7, wherein the ceramic mixture solution (S) comprises 5% to 15% by weight of an acrylate-based oligomer compound, 1% to 10% by weight of an acrylate-based monomer, 1% to 10% by weight of a photoinitiator, and 1% to 10% by a dispersant, on the basis of 100% by weight of the ceramic powder.

\* \* \* \* \*